United States Patent [19]

Bosso et al.

[11] 4,110,287

[45] Aug. 29, 1978

[54] CATAPHORETIC N-HETEROCYCLIC-CONTAINING RESINS FOR ELECTRODEPOSITION

[75] Inventors: Joseph F. Bosso, Lower Burrell; Nicholas T. Castellucci, Pittsburgh, both of Pa.

[73] Assignee: PPG Industries, Inc., Pittsburgh, Pa.

[21] Appl. No.: 807,757

[22] Filed: Jun. 17, 1977

Related U.S. Application Data

[63] Continuation-in-part of Ser. No. 561,012, Mar. 21, 1975, abandoned.

[51] Int. Cl.$^2$ ............................................. C08L 63/02
[52] U.S. Cl. .......................... 260/29.2 EP; 204/181 C; 260/29.2 TN; 260/29.3; 260/29.4 R; 260/29.6 NR; 428/418; 526/13; 528/73; 528/117; 528/118; 528/271; 528/418; 528/420
[58] Field of Search ............ 260/47 EN, 47 EP, 2 N, 260/2 EP, 29.2 EP, 59, 77.5 Q, 77.5 NC, 77.5 AM, 77.5 TB; 204/181

[56] References Cited

U.S. PATENT DOCUMENTS

| | | | |
|---|---|---|---|
| 2,676,166 | 4/1954 | Webers | 260/2 |
| 3,020,262 | 2/1962 | Speranza | 260/47 |
| 3,257,347 | 6/1966 | Woods | 260/47 EN |
| 3,301,804 | 1/1967 | Zora | 260/29.2 |
| 3,619,398 | 11/1971 | Bosso | 204/181 |
| 3,640,910 | 2/1972 | Porret et al. | 260/2 EP |
| 3,676,397 | 7/1972 | Clarke | 260/47 EP |
| 3,793,248 | 2/1974 | Porret et al. | 260/47 |
| 3,799,894 | 3/1974 | Porret et al. | 260/2 EP |
| 3,839,252 | 10/1974 | Bosso et al. | 260/47 EC |
| 3,846,442 | 11/1974 | Habermeier | 260/309.5 |

*Primary Examiner*—Theodore E. Pertilla
*Attorney, Agent, or Firm*—William J. Uhl

[57] ABSTRACT

Water-dispersible resins formed from polyglycidyl ethers of polyphenols and N-heterocyclic compounds and containing cationic salt groups are disclosed. The resins can be dispersed or dissolved in water, and can be applied to a wide variety of different substrates by electrodeposition, depositing on the cathode to provide superior corrosion-resistant coatings.

11 Claims, No Drawings

CATAPHORETIC N-HETEROCYCLIC-CONTAINING RESINS FOR ELECTRODEPOSITION

CROSS-REFERENCE TO RELATED APPLICATIONS

This application is a continuation-in-part of application Ser. No. 561,012, filed Mar. 21, 1975 abandoned.

BACKGROUND OF THE INVENTION

1. Field of the Invention

This invention relates to a resinous electrodepositable composition which deposits on the cathode. More particularly, this invention relates to cationic salt group-containing resins which contain N-heterocyclic moieties in the resin molecule.

2. Brief Summary of the Prior Art

U.S. Pat. No. 3,839,252 to Bosso et al discloses water-dispersible resins formed from epoxy-containing materials and containing quaternary ammonium salt groups. The resins are particularly useful for cationic electrodeposition. Examples of suitable epoxy-containing compounds are nitrogen-containing epoxies which are reaction products of monoepoxides such as epichlorohydrin with 5,5-dimethyl hydantoin, bis(5,5-dimethyl) hydantoin and related compounds. The present invention provides a superior class of nitrogen epoxy resins for cationic electrodeposition.

SUMMARY OF THE INVENTION

According to the present invention, there are provided waterdispersible resins which are electrodepositable on the cathode and which contain in the resin molecule cationic salt groups selected from the class consisting of amine salt groups and/or onium salt groups. The resin is prepared from polyglycidyl ethers of polyphenols. The resin molecule contains N-heterocyclic moieties obtained by reacting the polyglycidyl ether of polyphenol with an N-heterocyclic material containing a 5 or 6-membered ring and containing

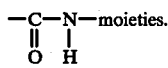 moieties.

The invention also provides for a method of electrocoating employing water dispersions of such resins.

The resin compositions of the present invention have been found to give superior coatings, having high corrosion resistance, reduced yellowing upon aging and, in some instances, increased throwpower upon deposition.

DETAILED DESCRIPTION

The polymeric polyepoxides from which the resins of the present invention are prepared are selected from the class consisting of polyglycidyl ethers of polyphenols, preferably Bisphenol A.

The polyglycidyl ethers of polyphenols such as Bisphenol A may be produced, for example, by etherification of a polyphenol with epichlorohydrin or dichlorohydrin in the presence of an alkali. The phenolic compound may be bis(4-hydroxyphenyl)-2,2-propane, 4,4'-dihydroxybenzophenone, bis(4-hydroxyphenyl)1,1-isobutane; bis(4-hydroxytertiarybutylphenyl)-2,2-propane; bis(2-hydroxynaphthyl)methane, 1,5-hydroxynaphthalene or the like. Another quite useful class of polyepoxides are produced similarly from novolak resins or similar polyphenol resins.

The polymeric polyepoxides described above are reacted with an N-heterocyclic material containing at least two groups reactive with epoxy moieties, usually hydrogen atoms, and containing

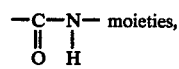 moieties, preferably

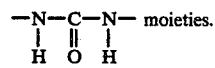 moieties.

The reaction can be looked at as a chain extension designed to increase or advance the molecular weight of the polymeric polyepoxides. The chain extender in effect acts as a chemical bridge between relatively low molecular weight polymer chains bridging them to produce advanced or high molecular weight products. Usually the bridging is done between terminal reactive groups on the polymer chains. An example of chain extension would be as follows: In the reaction of low molecular weight diepoxide polymers with chain extenders such as 5,5-dimethyl hydantoin, which is the preferred species in the practice of the present invention, higher molecular weight diepoxides are produced. Thus, the reaction of four equivalents of a relatively low molecular weight polyglycidyl ether of Bisphenol A and two equivalents of 5,5-dimethyl hydantoin yields an advanced diepoxide according to the following equation:

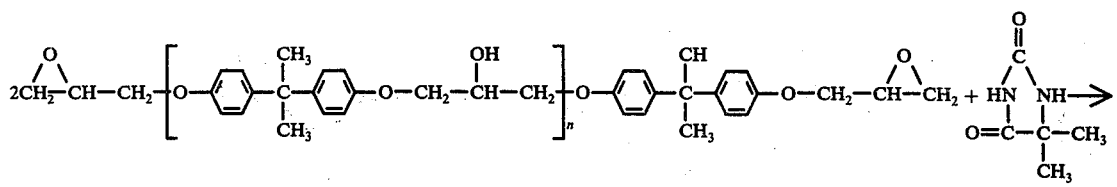

-continued

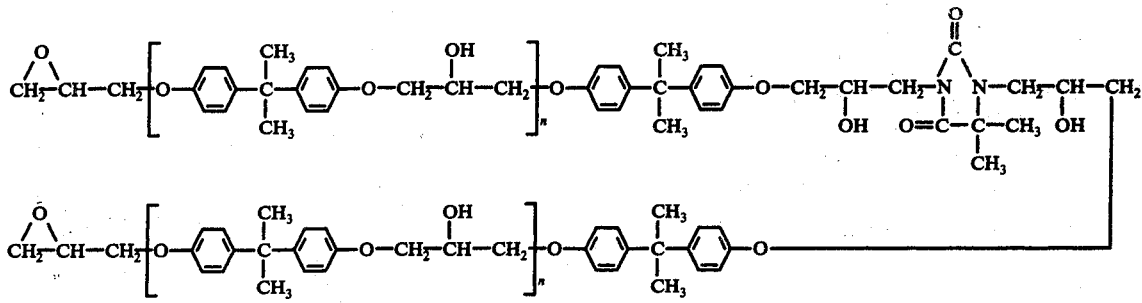

wherein n is greater than 0.1.

In practice, mixtures of higher polymeric and lower polymeric, chain extended or advanced epoxy resins are produced, with a composition of the mixture being displaced in favor of higher polymeric compounds when using relatively larger equivalent quantities of the chain extender. In general, in the practice in preparing resins of the present invention which are suitable for use in electrodeposition, about 0.2 to 0.8 equivalent of chain extender per equivalent of epoxy group is usually used. Also, the production of essentially linear polymers is preferred. Linear polymers are produced through the reaction of diepoxides and difunctional chain extenders. Linear reaction products have been found upon subsequent cationic salt group formation to disperse better and to form superior coatings.

The chain extenders of the present invention are preferably N-heterocyclic compounds containing

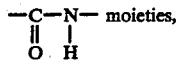

preferably

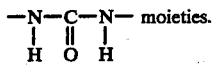

These compounds can be depicted as having the following structural formula:

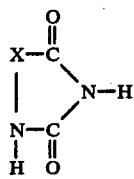
(I)

wherein X is a bivalent radical which is necessary to complete a 5-membered or 6-membered unsubstituted or substituted heterocyclic ring. The radical X in formula I preferably contains only carbon and hydrogen or carbon, hydrogen and oxygen. X can be a radical of the formulae:

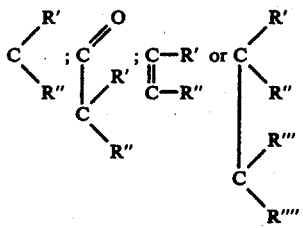

whereby R', R", R''', and R'''' can each represent, independently of each other, a hydrogen atom or, e.g., an alkyl radical, an alkenyl radical, a cycloalkyl radical, or optionally a phenyl or substituted phenyl radical. Specific examples would include the following radicals:

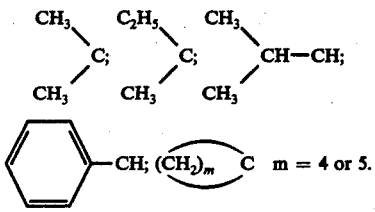

Examples of N-heterocyclic compounds satisfying I above are hydantoin and dihydrouracil compounds having the following structural formula:

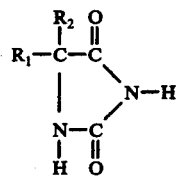
(II)

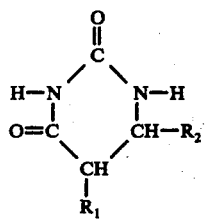
(III)

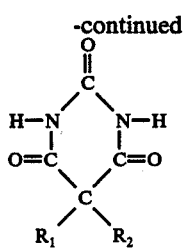

In II, III and IV, $R_1$ and $R_2$ each represent a hydrogen atom, or an aliphatic, cycloaliphatic, araliphatic or aromatic hydrocarbon radical, or wherein $R_1$ and $R_2$ together form a bivalent aliphatic or cycloaliphatic hydrocarbon radical. Examples of II include 5,5-dimethyl hydantoin, 5-methyl-5-ethyl hydantoin, 5-propyl hydantoin, 5-isopropyl hydantoin. Examples of III include dihydrouracil, 5,6-dihydrouracil, 6-methyl-5,6-dihydrouracil. Also, uracil derivatives similar to the dihydrouracil compounds can be employed. Examples of IV include barbituric acid, 5-ethyl barbituric acid, 5,5-diethylbarbituric acid.

Also, the chain extender can be binuclear in which the N-heterocyclic compound has the following structural formula:

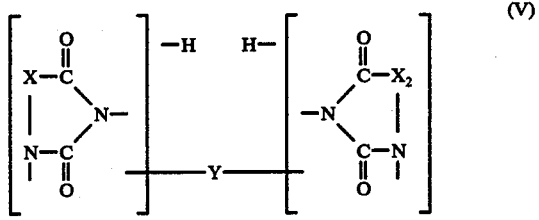

(V)

wherein $X_1$ and $X_2$ independently of one another each denote a radical which is necessary to complete a 5-membered or 6-membered unsubstituted or substituted heterocyclic ring and Y represents a bivalent aliphatic, cycloaliphatic, aryl or araliphatic radical, and preferably an alkylene radical or alkylene radical which is interrupted by oxygen atoms. Y can also represent moieties containing ester linkages; see, for example, Canadian Patent 951,732 wherein Y can represent

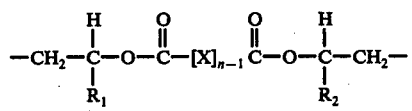

wherein $R_1$ and $R_2$ each represent a hydrogen atom, a methyl group or ethyl group, or a phenyl group; X represents a hydrocarbon radical and n is 1 or 2. Y can also represent moieties containing amido linkages; see, for example, U.S. Pat. No. 3,846,442 wherein Y can represent

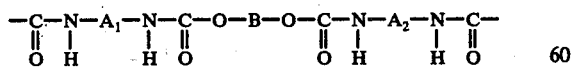

wherein $A_1$ and $A_2$ each represent a bivalent aliphatic, cycloaliphatic, cycloaliphatic-aliphatic, araliphatic, aromatic or heterocyclic-aliphatic radical and B represents the radical obtained by separation of the two hydroxyl groups of an aliphatic, cycloaliphatic, cycloaliphatic-aliphatic, araliphatic or heterocyclic-aliphatic dialcohol. Y can also represent moieties containing ether linkages, particularly hydroxy-containing polyether moieties. For example, Y can represent

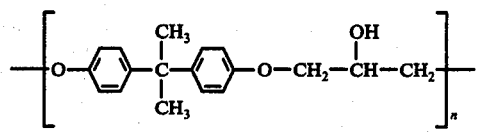
(IV)

where $n \geq 1$. Examples of N-heterocyclic compounds satisfying V above are bis-hydantoin and bis-dihydrouracil compounds having the following structural formula:

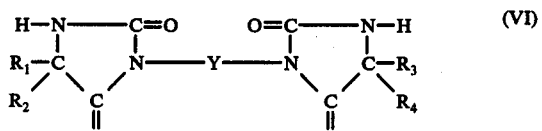
(VI)

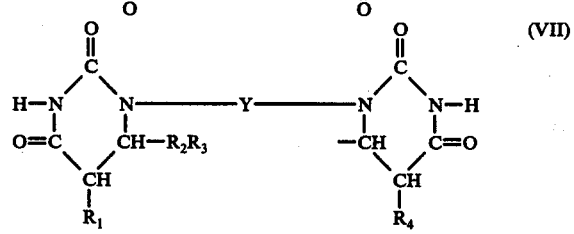
(VII)

wherein $R_1$, $R_2$, $R_3$ and $R_4$ each denote a hydrogen atom or an aliphatic, cycloaliphatic, araliphatic or aromatic hydrocarbon radical, or wherein $R_1$ and $R_2$, and $R_3$ and $R_4$ in VI together form a bivalent aliphatic or cycloaliphatic hydrocarbon radical. Specific examples of VI are as follows: bis(5,5-dimethyl-hydantoinyl-3) methane, 1,2-bis(5',5'-dimethylhydantoinyl-3') ethane, 1,4-bis(5',5'-dimethyl-hydantoinyl-3') butane, 1,6-bis(5',5'-dimethyl-hydantoinyl-3') hexane, 1,12-bis(5',5'-dimethylhydantoinyl-3') dodecane and beta, beta'-bis(5',5'-dimethyl-hydantoinyl-3')diethyl ether.

Specific examples of VII include: 1,1'-methylene-bis(5,6-dihydrouracil), 1,1'-methylene-bis(6-methyl-5,6-dihydrouracil), and 1,1'-methylene-bis(5,5'-dimethyl-5,6-dihydrouracil). Also, bis-uracil derivatives similar to the bis-dihydrouracil compounds mentioned above can be employed.

Although not preferred, trifunctional N-heterocyclic compounds can be employed. Examples include isocyanurated derivatives having the following structural formula:

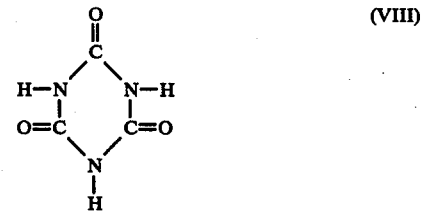
(VIII)

The nitrogeneous chain extended epoxy adducts used in the practice of the present invention are produced by heating the polymeric polyepoxide compound together with the nitrogeneous compound at an elevated temperature. In the case of normally solid reactant, the reaction temperature should be above the melting point of the reactants. Usually a reaction temperature within the range of from about 100° to 220° C. is satisfactory.

As mentioned above, about 0.2 to 0.8 equivalent of nitrogeneous chain extender per equivalent of epoxy group should be employed in the reaction to prepare resins most suitable for use in electrodeposition.

The reaction can be accelerated by adding a suitable catalyst. Such catalysts are, for example, alkali hydroxides such as sodium hydroxide or alkali halide such as lithium chloride, potassium chloride or sodium chloride, bromide or fluoride; tertiary amines such as triethylamine, tri-n-propylamine. Quaternary and ternary onium salts, e.g., ethyl triphenyl phosphonium iodide, trimethyl benzyl ammonium chloride, etc. may also be used. Depending on the choice of starting materials, the reaction may, in some cases, take place quantitatively so rapidly that no addition of catalyst is necessary. While the starting substances are as a rule mixed with one another at room temperature, and are then brought to reaction temperature, it is advantageous in the case of very reactive components if the polymeric polyepoxide compound is first introduced and heated by itself to the requisite reaction temperature and the chain extender then added in small portions.

The resins of the present invention are made water dispersible by the inclusion of cationic salt groups into the resin molecule. The salt groups are selected from the class consisting of onium salt groups and amine salt groups. The cationic salt groups can be incorporated into the resin molecule by reacting the nitrogen-containing epoxy-containing polymers prepared as described above with an onium salt group former and/or an amine salt group former. In the case of an onium salt, the epoxy-containing polymer can be reacted with an amine acid salt, a sulfide-acid mixture, a phosphine-acid mixture. The quaternizing reactant (amine acid salt, phosphine-acid mixture) or ternarizing reactant (sulfide-acid mixture) is reacted with the nitrogen-containing epoxy-containing polymer in an amount and at a temperature sufficient to provide a quaternary ammonium, quaternary phosphonium or ternary sulfonium salt-containing, water-dispersible resin. Obviously, mixed reactants can be used to provide mixed quaternary and ternary resins. Also, quaternary and ternary resins can be mixed with one another. Procedures for reacting the epoxy-containing polymers with the onium salt group former are known in the art. For example, with regard to forming quaternary ammonium salt group-containing resins, reference is made to U.S. Pat. Nos. 4,001,156; 3,839,252 and 3,962,165, both to Bosso and Wismer. With regard to forming quaternary phosphonium salt group-containing resins and ternary sulfonium group-containing resins, reference is made to U.S. Pat. No. 3,894,922 to Bosso and Wismer and U.S. Pat. No. 3,793,278 to DeBona.

The formation of amine salt group-containing resins is also well known in the art, and involves the reaction of the epoxy polymer with a primary or secondary amine followed by neutralization with acid to form the amine acid salt. The preparation of amine salt resins is described in U.S. Pat. Nos. 3,984,299 to Jerabek; 3,947,338 to Jerabek and Marchetti; 3,947,339 to Jerabek, Marchetti and Zwack.

The particular reactants, proportions and reaction conditions chosen for forming the cationic salt groups should be in accordance with considerations well known in the art, so as to avoid gelation of the product during the reaction. For example, excessively severe reaction conditions should not be employed. Similarly, compounds having reactive substituents should not be utilized along with epoxy compounds with which their substituents might react adversely at the desired conditions.

Aqueous compositions containing the above-described reaction products are highly useful as coating compositions and can be applied by any conventional method, such as by dipping, brushing, etc. They are, however, eminently suited to application by electrodeposition.

The resins are water-dispersible, per se, due to the presence of the quaternary or ternary onium salt groups. The term "dispersion" within the context of the present invention means a heterogeneous two-phase water-quaternary or ternary onium resin system in which water forms the continuous phase. The dispersions are stable, that is, they will not settle, over the temperature range of 20°-100° C. without the need for surfactant.

The concentration of the product in water depends upon the process sparameters to be used and is, in general, not critical, but ordinarily the major proportion of the aqueous composition is water, for example, the composition may contain from 1 to 40 percent by weight of the quaternary or ternary onium salt-containing resin based on total weight of the dispersion.

Preferably, the electrodepositable compositions contain a coalescing solvent. The use of the coalescing solvent provides for improved deposited film appearance. These solvents include hydrocarbons, alcohols, esters, ethers and ketones. The preferred coalescing solvents include monoalcohols, glycols and polyols as well as ketones and ether alcohols. Specific coalescing solvents include isopropanol, butanol, isophorone, 4-methylpentone-2, ethylene and propylene glycol, the monomethyl, monoethyl and monobutyl ethers of ethylene glycol, 2-ethylhexanol and hexyl CELLOSOLVE. The amount of solvent is not unduly critical, generally between about 0.1 percent and about 40 percent by weight, preferably between about 0.5 and about 25 percent by weight, based on total weight of resin solids.

While the resins hereinabove described may be electrodeposited as substantially the sole resinous component of the electrodeposited composition, it is frequently desirable in order to improve or modify film appearance and/or film properties, to incorporate into the electrodepositable compositions various non-reactive and reactive compounds or resinous materials, such as plasticizing material including N-cyclohexyl-p-toluene sulfonamide, ortho- and para-toluene sulfonamide, N-ethyl-ortho- and para-toluene sulfonamide, aromatic and aliphatic polyether polyols, phenol resins including allyl ether, liquid epoxy resins, quadrols, polycaprolactones; triazine resins such as melamine-based resins and benzoguanamine-based resins, especially alkylated formaldehyde reaction products thereof; urea formaldehyde resins, acrylic resins, hydroxyl and/or carboxyl group-containing polyesters and hydrocarbon resins. Blocked isocyanates are particularly desirable curing agents and will be described in more detail later. In general, these additional compounds or resins are present in an amount of about 0.5 to 60 percent by weight based on total weight of quaternary or ternary onium salt resin.

In most instances, a pigment composition and, if desired, various additives such as anti-oxidants, surfactants, or wetting agents, for example, FOAM KILL 639 (a hydrocarbon oil containing inert diatomaceous earth), as well as glycolated acetylenes (the SURFYNOLS, for example), sulfonates, sulfated fatty amides, and alkylphenoxypolyoxyalkylene alkanols, and the like are included in the dispersions. The pigment composition may be of any conventional type, comprising, for example, iron oxides, lead oxides, strontium chromate, carbon black, coal dust, titanium dioxide, talc, barium sulfate, as well as color pigments such as cadmium yellow, cadmium red, chromic yellow and the like. The pigment content of the dispersion is usually expressed as pigment-to-binder (quaternary or ternary onium salt-containing resin) ratio. In the practice of the present invention, pigment-to-binder ratios within the range of 0.01 to 5:1 are usually used. The other additives mentioned immediately above are present in the dispersion in an amount of 0.01 to 3 percent by weight based on weight of quaternary salt-containing resin.

In the electrodeposition processes employing the aqueous coating compositions described above, the aqueous composition is placed in contact with an electrically conductive anode and an electrically conductive cathode, with the surface to be coated being the cathode, while in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 and 500 volts. The current density is usually between about 1.0 ampere and 15 amperes per square foot, and tends to decrease during electrodeposition.

The method of the invention is applicable to the coating of any conductive substrate, and especially metals such as steel, aluminum, copper, magnesium or the like. After deposition, the coating is cured, usually by baking at elevated temperatures. Temperatures of 120° C. to 260° C. for 1 to 30 minutes are typical baking schedules utilized.

The coating compositions of the present invention may optionally include a crosslinking or curing agent to give harder, more corrosion-resistant coatings. A preferred curing agent is a polyisocyanate. In this instance, the resins should contain groups which are reactive with the polyisocyanate such as active hydrogens derived from hydroxyl groups or amine groups. The polyisocyanate should be blocked so it will not react with the hydroxyl or amine groups in the coating composition until the coated article is heated to a high temperature sufficient to unblock the blocked polyisocyanate and cure the coating.

The polyisocyanate curing agent can be used in two similar ways. The polyisocyanate can be fully capped, that is, no free isocyanate groups remain, and added to the cationic salt-containing resin to form a two-component system. With regard to the preparation of resins of this type, reference is made to U.S. Pat. No. 3,984,299 to Jerabek and U.S. Pat. application Ser. No. 562,086, filed Mar. 26, 1975 to Bosso and Sturni. The polyisocyanate can also be partially capped, e.g., a half-capped diisocyanate, so that reactive isocyanate groups remain. The partially capped isocyanate can then be reacted with the resin through the active hydrogen functionality under conditions which will not unblock the isocyanate. This reaction in effect fully caps the isocyanate, making it part of the polymer molecule and a one-component system. With regard to preparing resins of this type, reference is made to U.S. Pat. Nos. 3,947,338 and 3,935,087, both to Jerabek and Marchetti.

Whether partially capped or fully capped, sufficient polyisocyanate is present in the coating system so that there are about 0.1 to about 1.0 urethane groups for each active hydrogen atom.

It is sometimes necessary, in order to insure rapid and complete reaction of the two components, to have present in the coating mixture a catalyst for urethane formation. However, if curing temperatures after deposition are high enough, catalyst may not be needed. Also, if a proper blocking agent for the isocyanate is employed, e.g., oximes and phenols, catalyst may not be needed. Examples of externally added catalyst are the tin compounds such as dibutyltin dilaurate and tin acetate, dibutyltin oxide, which are preferred, but other catalysts for urethane formation known in the art may be employed. The amount of catalyst employed is that amount which effectively promotes reaction in the deposited film, for example, amounts varying from about 0.5 percent to about 4 percent by weight of the total resin solids may be employed. Typically about 2 percent by weight are employed.

Illustrating the invention are the following examples which, however, are not to be construed as limiting the invention to their details. All parts and percentages in the examples, as well as throughout this specification, are by weight unless otherwise specified.

EXAMPLE I

A reaction vessel was charged with 336 parts by weight of Bisphenol A and 1042 parts by weight of an epoxy resin solution (1000 parts solids) made from reacting epichlorohydrin and Bisphenol A. The resin had an epoxy equivalent of approximately 193–203 and was commercially available from the Shell Chemical Company as EPON 829. The reaction mixture was heated under a nitrogen blanket to exotherm, the highest temperature being 180° C. The reaction was controlled at 175°–180° C. for one hour.

The reaction vessel was then cooled to 155° C. and charged with 71.3 parts by weight of 5,5-dimethyl hydantoin and 28 parts by weight of a 10 percent solids solution in phenyl CELLOSOLVE (ethylene glycol monophenyl ether) of ethyltriphenyl phosphonium iodide catalyst. The reaction mixture was agitated and permitted to increase in temperature to 180° C. over a two-hour period. The reaction mixture was then cooled to 165° C. and diluted with 7.5 parts by weight of a hydrocarbon oil-containing diatomaceous earth surfactant commercially available as FOAM KILL 639 dissolved in 165.3 parts by weight of 2-ethylhexanol.

The reaction mixture was then cooled to 95° C. at which time a solution of 80.2 parts by weight of dimethylethanolamine-lactic acid salt dissolved in 80 parts by weight of a 4.5 percent by weight aqueous boric acid solution was added to the reaction mixture over a 15-minute period to quaternize the epoxy resin. After the addition of the quaternizing agent, the reaction mixture was opaque. Fifteen minutes later at 96° C., the reaction mixture cleared. The mixture was digested at 96° C. for an additional 30 minutes. The mixture was then diluted first with 151 parts by weight of a 4.5 percent by weight boric acid solution and then with 328 parts by weight of isopropanol.

An electrodeposition bath was prepared by diluting 292 parts by weight of the reaction product prepared as described immediately above with about 1600 parts by weight of deionized water to form an 11.5 percent solids dispersion. A zinc phosphated steel panel was cathodically coated by this bath (bath temperature at 27° C.) using 400 volts for 90 seconds. At these conditions, the bath had a Ford throwpower of 5¼ inches. There was obtained an adherent coating on the cathode which, when baked at 177° C. for 45 minutes, gave a hard film (4H pencil hardness) of 0.5 mil thickness.

EXAMPLE II

A reaction vessel was charged with 560.5 parts by weight of Bisphenol A and 1736.7 parts by weight (1666.7 parts solids) of EPON 829. The reaction mixture was heated under a nitrogen blanket to exotherm, the highest temperature being 170° C. for 55 minutes.

The reaction vessel was then charged with 119 parts by weight of 5,5-dimethyl hydantoin and 46.7 parts by weight of a 10 percent solids solution (in phenyl CELLOSOLVE) of ethyltriphenyl phosphonium iodide catalyst. The reaction mixture was agitated and held at a temperature of about 170° C. for a two-hour period. The reaction mixture was then cooled to 155° C. and diluted with 15.3 parts by weight of FOAM KILL 639 dissolved in 337 parts by weight of 2-ethylhexanol.

The reaction mixture was then cooled to 85° C., at which time 522 parts by weight of dimethyl cyclohexylamine-lactic acid salt (391.6 parts by weight solids in isopropanol) and 248.6 parts by weight of a 4.5 percent by weight aqueous boric acid solution were added to the reaction mixture over a 15-minute period to quaternize the epoxy resin. After addition of the quaternizing agent, the reaction mixture was opaque. Fifteen minutes later at 94° C., the reaction mixture cleared. The reaction mixture was digested at 90°-94° C. for an additional 45 minutes. After the resin was clarified, 363.5 parts by weight of isopropanol and 126.2 parts by weight of isophorone were added respectively to the reaction mixture. The mixture was then cooled to 70° C. and 322.0 parts by weight of the diurethane prepared from 2,4-toluene diisocyanate and 2-ethylhexanol (305.9 parts by weight solids) was added to the reaction mixture. The mixture of quaternized resin and fully blocked polyisocyanate was homogeneous, having a viscosity of 360,000 centipoises and a solids content of 70 percent.

To prepare an electrodepositable thermosetting cationic urethane composition, 271 parts by weight of the mixture of the hydantoin-containing epoxy resin and the diurethane crosslinker were further mixed with 45 parts by weight of PENTOXONE (4-methoxy-4-methyl pentanone-2), 3.8 parts by weight of dibutyltin dilaurate and 2.0 parts by weight of surfactant, sorbitol monooleate commercially available as TWEEN-40. The resultant mixture was reduced to an approximately 10 percent solids dispersion by slowly adding 1578 parts by weight of deionized water to form an electrodeposition bath. When electrodeposited upon a zinc phosphated steel panel for 90 seconds at 200 volts, the resultant smooth film after curing for 20 minutes at 210° C. gave a glossy, hard, acetone-resistant film.

EXAMPLE III

A reaction vessel was charged with 1042 parts by weight (1000 parts by weight solids) of EPON 829 and 336.3 parts by weight of Bisphenol A. The reaction mixture was heated under a nitrogen blanket to exotherm, the highest temperature being 163° C. The reaction mixture was controlled at 160°-165° C. for 45 minutes. The reaction vessel was then charged with 71.3 parts by weight of 5,5-dimethyl hydantoin and 28 parts by weight of a 10 percent solids solution (in phenyl CELLOSOLVE) of ethyltriphenyl phosphonium iodide catalyst. The reaction mixture was agitated and held at a temperature of about 162° C. for a two-hour period and was then charged with 735 parts by weight (698 parts by weight solids) of 2-ethylhexanol halfcapped, 2,4-toluene diisocyanate. After addition of the half-capped toluene diisocyanate, the reaction mixture was very viscous. The mixture was thinned by adding 80 parts by weight of isophorone.

After stirring at 130°-135° C. for 45 minutes, an infrared analysis scan of the reaction mixture showed it to be essentially free of unreacted NCO, indicating complete reaction with the epoxy resin. The reaction mixture was cooled to 128° C. and diluted with 11.7 parts by weight of FOAM KILL 639 dissolved in 204.8 parts by weight of 2-ethylhexanol. The reaction mixture was then cooled to 110° C., at which time 305 parts by weight of dimethyl cyclohexylamine-lactic acid salt (228.8 parts by weight solids in isopropanol) and 144.5 parts by weight of a 4.5 percent by weight aqueous boric acid solution were added to the reaction mixture over a 15-minute period to quaternize the epoxy resin. After addition of the quaternizing agent, the reaction mixture was opaque. The reaction mixture was then digested at about 95° C. for a period of 15 minutes to clear the mixture. An additional 50 grams of isopropanol were added and the reaction mixture was stirred at 90°-95° C. for an additional 40 minutes. The mixture was then diluted with 665.4 parts by weight of isopropanol. The resultant mixture had a solids content of 72.7 parts by weight and a viscosity of about 500,000 centipoises.

An electrodepositable thermosetting cationic urethane composition was prepared as follows: 240 parts by weight of the hydantoin-containing, capped isocyanate-containing, quaternary ammonium-containing resin was mixed with 2 parts by weight of dibutyltin dilaurate urethane forming catalyst, 20 parts by weight of isophorone, and 2 parts by weight of TWEEN-40. The resulting mixture was reduced to an approximately 10 percent by weight solids dispersion by slowly adding 1484 parts by weight of deionized water to form an electrodeposition bath. The bath had a pH of about 4.9. Cathodic electrodeposition upon an iron phosphated steel panel (no chromic acid rinse) for 90 seconds at 150 volts (bath temperature 27° C.) produced a film which, after curing for 20 minutes at 177° C., was approximately 1 mil in thickness. The film was hard, having a 4H pencil hardness, and corrosion resistant in that after 168 hours of exposure to a salt spray fog according to ASTM 117, there was less than 1/16 of an inch total scribe creepage.

EXAMPLE IV

A pigmented electrodepositable thermosetting cationic urethane composition similar to Example III was prepared. To prepare this composition, a pigment paste was first prepared as follows: 137 parts by weight of the quaternized resin prepared as described in Example III (100 parts by weight solids) was blended with 400 parts by weight of $TiO_2$ pigment and 160 parts by weight of butyl CELLOSOLVE (ethylene glycol monobutyl ether). The resultant blend was ground in a sand mill to a Hegman No. 7.

One hundred twenty-four parts by weight of the pigment paste was then mixed with 222 parts by weight (161 parts by weight solids) of the cationic urethane composition prepared as described above in Example III, 2 parts of dibutyltin dilaurate catalyst, 20 parts of isophorone and 2 parts of TWEEN-40. The mixture was thinned with 2130 parts of deionized water to form about a 10 percent solids dispersion electrodeposition bath having a pH of about 5.9. An iron phosphated steel panel (no chromic acid rinse) was cathodically coated by this bath, using 350 bolts for 90 seconds (bath temperature 27° C.). The resultant panel, after curing for 20 minutes at 177° C., had a 1.3 mil thickness film coating. The coating was hard and corrosion resistant. After 168 hours of exposure to salt spray fog, the total scribe creepage (TSC) was less than 1/32 of an inch, according to ASTM 117. After 456 hours of salt spray exposure, the TSC was less than ¼ of an inch.

EXAMPLE V

A reaction vessel was charged with 833 parts by weight (800 parts by weight solids) of EPON 829 and 269 parts by weight of Bisphenol A. The reaction mixture was heated under a nitrogen blanket to exotherm, the highest temperature being 225° C. The reaction mixture was controlled at a temperature of 155°-160° C. for an additional 25 minutes, and then charged with 57 parts by weight of 5,5-dimethyl hydantoin and 22 parts by weight of a 10 percent solid solution (in phenyl CELLOSOLVE) of ethyltriphenyl phosphonium iodide catalyst. The reaction mixture was agitated and permitted to increase in temperature to 190° C. and maintained for 1¼ hours. The reaction was then cooled to about 175° C. and diluted with about 100 parts by weight of PENTOXONE. The reaction mixture was then cooled for an additional 20 minutes to 125° C., after which time 296 parts (281 parts solids) of 2-ethylhexyl half-capped toluene diisocyanate was added to the reaction mixture and stirred for one hour at 120°-125° C. An additional 78 grams of PENTOXONE was added to the reaction mixture and the mixture further thinned with 178 parts by weight of 2-ethylhexanol and cooled to 100° C. An infrared scan indicated no free NCO. At 100° C., 109 parts by weight of thiodiethanol dissolved in 94 parts by weight of an 85 percent aqueous lactic acid solution and an additional 100 grams of deionized water was added to the reaction mixture over a period of 10 minutes to ternarize the resin. At the end of the addition, the reaction mixture was an opaque, yellow mass. The reaction mixture was then digested for about 30 minutes by slowly raising the temperature from 88° to 100° C., after which time the reaction mixture was still an opaque, yellow mass. The reaction mixture was then thinned with 321 parts by weight of isopropanol to produce a 65 percent total solids.

An electrodeposition bath was prepared by blending 248 parts by weight of the above-described ternary sulfonium-containing resin (160.8 parts by weight solids) with 2 parts by weight of dibutyltin dilaurate urethane forming catalyst and 124 parts by weight of the pigment paste described in working Example IV above. The blend was then thinned with 2126 parts by weight of deionized water to form about a 10 percent solids electrodeposition bath having a pH of about 4.2.

An iron phosphated steel panel (no chromic acid rinse) was cathodically coated by this bath (bath temperature at 27° C.) using 350 volts for 90 seconds. The resultant panel, after curing for 15 minutes at 204° C., was approximately 1 mil in thickness, hard and corrosion resistant. The film had a 6H pencil hardness and after 168 hours of salt spray exposure according to ASTM 117, the TSC was less than 1/16 of an inch.

EXAMPLE VI

A reaction vessel was charged with 3474 parts by weight of EPON 829 (3333.3 parts by weight solids) and 1121.5 parts by weight of Bisphenol A. The reaction mixture was heated under a nitrogen blanket to exotherm and the reaction continued at a temperature of 150° C. for about two hours.

To 515 parts by weight of the reaction product prepared above at a temperature of about 160° to 170° C. was added 17.5 parts by weight of 2-imidazolidinone

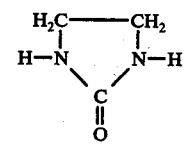

and 10.4 parts by weight of a 10 percent solids solution (in phenyl CELLOSOLVE) of ethyltriphenyl phosphonium iodide catalyst. The reaction mixture was held at 160°-170° C. for two hours and the resin became very viscous. The reaction mixture was thinned with 47.6 parts of TEXANOL (2,2,4-trimethyl pentanediol-1,3-monoisobutyrate) and 47.6 parts by weight of phenyl CELLOSOLVE. The reaction mixture was cooled to 100° C. and further thinned with 28.8 parts by weight of ethyl CELLOSOLVE, after which 38.8 parts by weight of a 75 percent solids solution in isopropanol of dimethyl ethanolamine lactic acid salt and 28.8 parts by weight of deionized water was added to the reaction mixture to quaternize the resin. After addition, the resultant reaction mixture was cloudy and the reaction temperature was maintained at 95° C. for two hours to clear the resin. The resultant quaternized resin had a solids content of 74.5 percent. The resin dispersed in deionized water showed a pH of 6.5 and gave a bluish-white dispersion.

An electrodeposition bath was prepared by mixing 121 parts by weight of the above resin with 780 parts by weight of deionized water to form about a 10 percent solids bath. A zinc phosphated steel panel was cathodically coated by this bath (bath temperature 25° C.) using 300 volts for two minutes to produce an adherent coating on the cathode which when baked at 177° C. for 45 minutes gave a hard film of 0.5-0.7 mil thickness.

EXAMPLE VII

A reaction vessel was charged with 3474 parts by weight of EPON 829 (3333.3 parts solids) and 1121.5 parts by weight of Bisphenol A. The reaction mixture was heated under a nitrogen blanket to exotherm and the reaction continued at a temperature of 150° C. for about two hours.

To 515 parts by weight of the reaction product prepared as described above and at a temperature of 160°-170° C. was added 22.8 parts by weight of uracil

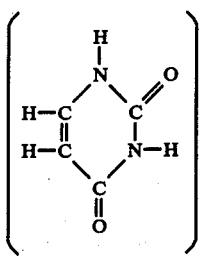

and 10.4 parts by weight of a 10 percent solids solution (in phenyl CELLOSOLVE) of ethyltriphenyl phosphonium iodide catalyst.

The reaction mixture was heated to exotherm and the reaction mixture held at a temperature of 170° C. for about 20 minutes and then heated to 200° C. for about 30 minutes to dissolve all of the uracil. The reaction mixture was then cooled to 180° C. and thinned with 48 parts by weight of TEXANOL, 75.4 parts by weight of phenyl CELLOSOLVE and 29.1 parts by weight of ethyl CELLOSOLVE (ethylene glycol monoethyl ether). The mixture was cooled to 100° C. and 38.8 parts by weight of a 75 percent solids solution in isopropanol of dimethyl ethanolamine-lactic acid salt and 29 parts by weight of deionized water was added to the reaction mixture to quaternize the resin. After addition was completed, the resultant reaction mixture was cloudy and the reaction mixture was digested at 90°-95° C. for an hour to clear the mixture, after which time 20.9 parts by weight of methyl isobutyl ketone was added to the mixture. The resultant quaternized resin was viscous and had a solids content of 69.9 percent.

An electrodeposition bath was prepared by mixing 275 parts by weight of the quaternized resin prepared as described above with 10.1 parts by weight of methyl ethyl ketone and 1639.9 parts by weight of deionized water to form about a 10 percent total solids dispersion. The bath was further thinned with 20 parts by weight of TEXANOL and 10 parts by weight of phenyl CELLOSOLVE. A cold rolled steel panel was cathodically coated by this bath (bath temperature was 25° C.) using 200 volts for two minutes to produce an adherent coating on the cathode which when baked at 177° C. for 45 minutes gave a hard film of 1.0–1.5 mil thickness. The film was somewhat rough and cratered. The film had fairly good solvent resistance, taking 16 double rubs with an acetone-wetted cloth to remove the film from the substrate.

EXAMPLE VIII

Two hundred twenty seven (227) parts by weight of the quaternized resin of Example VII was combined with 33.5 parts by weight of 2-ethylhexanol fully capped 2,4-toluene diisocyanate. The mixture was combined with 21.5 parts by weight of methyl ethyl ketone, 2.9 parts by weight of dibutyltin diacetate catalyst and 1651.1 parts by weight of deionized water to form about a 10 percent solids electrodeposition bath.

A cold rolled steel panel was cathodically coated by this bath (bath temperature 25° C.) using 200 volts for two minutes to produce an adherent coating on the cathode which when baked at 350° F. for 45 minutes gave a hard film of 1.0–1.5 mil thickness. The coating was rough and somewhat cratered. The film had excellent solvent resistance in that after 40 double rubs with an acetone-wetted cloth, the film did not even soften.

EXAMPLE IX

An epoxy-5,5-dimethyl hydantoin adduct was prepared and this adduct used to advance the molecular weight of a polyepoxide. The proposed structure of the adduct was as follows:

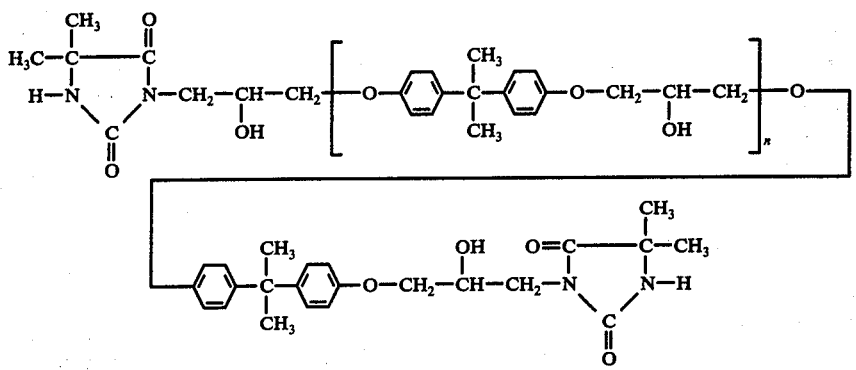

where $n$ is about 0.18–0.21.

The adduct was prepared as follows: 1042 parts by weight of EPON 829 (1000 parts solids) and 673.8 parts by weight of 5,5-dimethyl hydantoin were charged to a reaction vessel and heated to 170° C. to initiate an exotherm. The reaction was continued at exotherm for about 2½ hours with the peak temperature being 233° C.

To a second reaction vessel was charged 1042 parts by weight of EPON 829 (1000 parts solids) and 299 parts by weight of Bisphenol A. The reaction mixture was heated under a nitrogen blanket to exotherm and the reaction continued at a temperature of 150° C. for about two hours.

The reaction mixture was cooled to 120° C. and 413.4 parts by weight of the epoxy-5,5-dimethyl hydantoin adduct prepared as described above was charged. The reaction mixture was digested at 130° C. for one hour, after which time 34 parts by weight of a 10 percent solids solution (in phenyl CELLOSOLVE) of ethyltriphenyl phosphonium iodide catalyst was charged to the mixture. The reaction mixture was heated to 180°–193° C. for two hours followed by cooling to room temperature and storing over night. The reaction mixture the next morning was then heated to 180° C. and then thinned with 333.5 parts by weight of PENTOXONE. The reaction mixture was cooled to 120° C. and 732 parts by weight of 2-ethylhexanol half-capped 2,4-toluene diisocyanate was charged to the mixture.

The mixture was digested at 96° C. for 15 minutes and then heated to 120° C. and held for one hour. The reaction mixture was thinned with 333.5 parts by weight of hexyl CELLOSOLVE and the mixture cooled to 100° C. Three hundred fifty-five (355.7) parts by weight of a 75 percent solids solution in isopropanol of dimethyl cyclohexylamine-lactic acid salt and 140.5 parts by weight of deionized water were added to quaternize the resin. The reaction mixture was held at 90°-95° C. for one hour to clear the resin. The reaction mixture was then cooled to 86° C. and thinned with 127.7 parts by weight of isopropanol.

An electrodeposition bath was prepared by mixing 272.2 parts by weight of the quaternized resin prepared as described above (190 parts solids) with 3.8 parts of dibutyltin diacetate and 1630 parts by weight of deionized water to form a 10.3 percent solids dispersion. Zinc phosphated steel panels cathodically coated by this bath (bath temperature 25° C.) using 300 volts for 90 seconds produced adherent coatings on the cathode which when baked at 177° C. for 20 minutes produced hard acetoneresistant coatings. The baked coatings were somewhat rough and thick.

EXAMPLE X

A reaction vessel was charged with 1350 parts by weight of EPON 829 (1296 parts solids) and 304 parts by weight of Bisphenol A. The reaction mixture was heated under a nitrogen blanket to exotherm and the reaction continued (peak temperature 180° C.) for about two hours. The reaction mixture was cooled to room temperature and 666.4 parts of the epoxy-5,5-dimethyl hydantoin adduct prepared as described in the beginning of Example IX was added to the reaction mixture. The temperature of the reaction mixture was raised to 130° C. to melt completely the adduct after which time 35 parts by weight of a 10 percent solids solution (in phenyl CELLOSOLVE) of ethyltriphenyl phosphonium iodide catalyst was charged to the reaction mixture. The reaction mixture was stirred at 175°-193° C. for two hours. The reaction mass was then thinned with 300 parts by weight of PENTOXONE. The reaction mixture was cooled to 124° C. and 650 parts of 2-ethylhexanol half-capped isophorone diisocyanate was charged to the mixture followed by charging another 70 parts by weight of PENTOXONE. The mixture was digested at 105° C. for 10 minutes and then heated to 120° C. for one hour. Three hundred seventy (370) parts by weight of 2-ethylhexanol was added to the reaction mixture and the mixture cooled to 100° C. Two hundred forty (240) parts by weight of thiodiethanol dissolved in 212 parts by weight of an 85 percent by weight aqueous lactic acid solution and an additional 180 parts by weight of deionized water was added to the resin mixture over a period of 15 minutes to ternarize the resin. The reaction mixture was digested for 20 minutes at 87°-93° C. and then thinned with 736 parts by weight of ethyl CELLOSOLVE to produce a 65 percent solids solution.

A pigment paste was prepared by blending 185 parts by weight of the ternary sulfonium resin prepared as described above (120 parts solids), 480 parts of $TiO_2$ and 100 parts of butyl CELLOSOLVE. The resultant blend was ground in a sand mill to a Hegman No. 7.

Two hundred twenty-five (225) parts by weight of the ternary sulfonium resin prepared as described above (145.9 parts solids) was mixed with 4 parts by weight of dibutyltin dilaurate and 133 parts by weight of the pigment paste prepared as described immediately above. The mixture was thinned with 2138 parts by weight of deionized water to form about a 10 percent solids paint dispersion electrodeposition bath having a pH of 5.5.

An iron phosphated steel panel (no chromic acid rinse) was cathodically coated by this bath using 150 volts (bath temperature 25° C.) for 90 seconds. The resultant panel after baking for 20 minutes at 177° C. had a 1.2 mil thickness film coating. The film was hard and corrosion resistant.

EXAMPLE XI

A quaternary ammonium resin as generally described in Example III was prepared from the following charge:

| Ingredient | Charge | Solids |
|---|---|---|
| EPON 829 | 1042 | 1000 |
| Bisphenol A | 336.3 | 336.3 |
| 5,5-dimethyl hydantoin | 71.3 | 71.3 |
| ethyltriphenyl phosphonium iodide (10% solids solution in phenyl CELLOSOLVE) | 28 | 2.8 |
| 2-ethylhexanol half-capped 2,4-toluene diisocyanate | 735 | 698 |
| PENTOXONE | 262.3 | |
| 2-ethylhexanol | 262.3 | |
| FOAM KILL | 11.7 | 11.7 |
| dimethyl cyclohexylamine lactic acid salt (75% solids solution in isopropanol) | 305 | 233.4 |
| 4.5% aqueous solution of $H_3BO_3$ | 148.9 | 6.7 |
| methyl ethyl ketone | 162 | |

A pigment paste was prepared by blending the following:

| Ingredient | Parts by Weight |
|---|---|
| TWEEN 81 (polyoxyethylene sorbitan monooleate) | 46 |
| isopropanol | 62 |
| FOAM MASTER LL | 9 |
| deionized water | 280 |
| $TiO_2$ | 792 |
| clay | 98 |
| yellow iron oxide | 6 |
| red iron oxide | 4 |
| carbon black | 2 |
| $SiO_2$ (SYLOID 161) | 20 |

The blend was ground in a sand mill to a Hegman No. 7.

An electrodeposition bath was prepared by mixing 385 parts by weight of the quaternary ammonium resin prepared as described above, 41 parts by weight of methyl ethyl ketone, 5.5 parts by weight of dibutyltin dilaurate, 113 parts by weight of the pigment paste prepared as described immediately above and 3055 parts by weight of deionized water to form a 10 percent by weight solids paint dispersion.

Zinc phosphated steel panels were cathodically coated by this bath at 200, 250 and 300 volts for 90 seconds (bath temperature 80° C.) to produce adherent coatings on the panels. The resultant panels after curing for 20 minutes at 350° F. had smooth film builds of 0.35, 0.40 and 0.5 mils, respectively.

The coated panels were then tested for detergent resistance according to ASTM D-2248-73, and passed 500 hours without failure.

EXAMPLE XII

A reaction vessel was charged with 1563 parts by weight of EPON 829 (1500 parts solids) and 504.5 parts by weight of Bisphenol A. The reaction mixture was heated under a nitrogen blanket to exotherm and the reaction mixture was continued for 1½ hours, the peak temperature reaching 195° C. The reaction mixture was cooled to 155° C. and 106.9 parts by weight of 5,5-dimethyl hydantoin charged, along with 42 parts by weight of a 10 percent solids solution (in phenyl CELLOSOLVE) of ethyltriphenyl phosphonium iodide catalyst. The reaction mixture was heated to 200° C. over a period of 1½ hours, then cooled to 170° C., followed by the addition of 12.6 parts by weight of FOAM KILL 639 dissolved in 277 parts by weight of 2-ethylhexanol. The reaction mixture was cooled to 125° C. and 486 parts by weight of dimethyl cyclohexylamine-lactic acid salt (75 percent solids in isopropanol) and 300 parts by weight of deionized water were added to the reaction mixture to quaternize the resin. After the addition of the quaternizing agent, the resinous mixture was opaque and yellow. The reaction mixture was digested at 95° C. for 20 minutes to clear the resin. The reaction mixture was stirred at 93°-95° C. for an additional 30 minutes, and then thinned with 246 parts by weight of methyl ethyl ketone and 296 parts by weight of isopropanol to form a 65 percent total solids solution.

An electrodeposition bath was prepared from the above resin by combining 307.7 parts by weight of the resin with 1692 parts by weight of deionized water to form about a 10 percent solids dispersion. A zinc phosphated steel panel was cathodically coated with this electrodeposition bath using 350 volts for 2 minutes (bath temperature 25° C.) to produce an adherent coating on the cathode which when baked at 196° C. for 20 minutes gave a film of approximately 0.45 to 0.50 mil thickness. The hardness and acetone resistance of the film is reported in the table below.

To the above electrodeposition bath was added 55.8 parts by weight of a 4.5 percent by weight aqueous solution of $H_3BO_3$ to form a bath containing 0.3 equivalents of $H_3BO_3$ per 1.0 quaternary ammonium equivalent. (This assumes $H_3BO_3$ as a monobasic acid.) This bath was then used to cathodically coat a zinc phosphated steel panel using conditions as described above for the bath containing no added $H_3BO_3$. An adherent coating on the cathode was obtained which when baked at 196° C. for 20 minutes gave a film of approximately 0.45 to 0.50 mil thickness. The hardness and acetone resistance of the film is reported in the table below.

To the electrodeposition bath described immediately above was added an additional 37.2 parts by weight of a 4.5 percent by weight aqueous $H_3BO_3$ solution to form a bath containing 0.5 equivalents of $H_3BO_3$ per 1.0 quaternary ammonium equivalent. The bath was used to cathodically coat zinc phosphated steel panels under the conditions described immediately above. Adherent coatings were produced on the cathode which when baked at 196° C. for 20 minutes gave films of approximately 0.45 to 0.50 mil thickness. Hardness and acetone resistance of the film is shown in the table below.

Table I

Hardness and Acetone Resistance of Films Deposited from Electrodeposition Baths Containing Various Amounts of $H_3BO_3$

| Bath No. | Hardness | Acetone Resistance |
|---|---|---|
| 1 (no $H_3BO_3$) | 2H | no acetone resistance |
| 2 (0.3 $H_3BO_3$) | 5H | 5 double rubs with acetone-wetted cloth |
| 3 (0.5 $H_3BO_3$) | 7H | 20 double rubs with acetone-wetted cloth |

The solvent resistance was determined by rubbing the coated samples with an acetone-saturated cloth until the coating was removed from the substrate.

EXAMPLE XIII

An amine group-containing resin was prepared from the following charge:

| Ingredient | Parts by Weight |
|---|---|
| EPON 829 | 855.6 |
| Bisphenol A | 44.4 |
| dimethyl hydantoin | 128.0 |
| ethyl triphenyl phosphonium iodide | 2.05 |
| phenyl CELLOSOLVE | 18.0 |
| methyl isobutyl ketimine of N-coco-1,3-propanediamine | 795.0 |
| methyl isobutyl ketone | 457.0 |

The EPON 829 and Bisphenol A were charged to a reaction vessel and heated to 185°-194° C. for about one hour. The reaction mixture was cooled to 150° C. and the dimethyl hydantoin and ethyl triphenyl phosphonium iodide and phenyl CELLOSOLVE were added. The reaction mixture exothermed with the highest temperature reaching about 180° C. After the exotherm ceased, the reacton mixture was cooled to 130° C. and the ketimine derivative and the methyl isobutyl ketone added. The reaction mixture was heated to 140° C. and was refluxed for about three hours followed by cooling to room temperature. The reaction product had a solids content of about 74 percent.

A pigment paste was prepared by blending the following ingredients and grinding to a Hegman No. 7 grind:

| Ingredient | Parts by Weight |
|---|---|
| amine group-containing resin prepared as described immediately above | 203 |
| methyl ethyl ketone | 97 |
| $TiO_2$ | 194 |
| lamp black | 1.9 |
| clay | 50.1 |
| lead silicate | 36 |
| strontium chromate | 18 |

A cataphoretic paint in which the amine group-containing resin was neutralized with acetic acid to form tertiary amine salt groups was prepared by blending the following in a Cowles mixer:

| Ingredient | Parts by Weight |
|---|---|
| amine group-containing resin | 265 |
| fully blocked isocyanate curing agent[1] | 178 |
| pigment paste prepared as described above | 228 |
| dibutyltin dilaurate | 7.6 |
| acetic acid | 18.2 |
| deionized water | 903 |

[1]Reaction product of one mole of trimethylolpropane and three moles of the 2-ethylhexyl monourethane of 2,4-toluene diisocyanate.

The paint prepared as described above was further thinned with 2200 parts of deionized water to form a 15 percent solids electrodeposition bath.

Both zinc phosphated and untreated steel panels were electrodeposited in this bath at 200 volts at a bath temperature of 77° F. (25° C.) to produce films of about 0.5 and 0.6 mil film build, respectively.

The coated panels were cured for 15 minutes at 410° F. (210° C.), scribed with an "X" and placed in a salt spray chamber at 100° F. (38° C.) at 100 percent relative humidity atmosphere of a 5 percent by weight aqueous sodium chloride solution for 21 days, after which time the creepage from the scribe mark was measured. The untreated steel panel had a scribe creepage of 1/16 of an inch with slight blistering over the face of the panel. The zinc phosphated steel panel had less than 1/32 of an inch scribe creepage with very slight blistering over the face of the panel.

EXAMPLE XIV

The following example shows the preparation of a quaternary phosphonium salt group-containing resin which contains N-heterocyclic moieties in the resin molecule.

A polyepoxide containing N-heterocyclic moieties in the polymer molecule was prepared from the following charge:

| Ingredient | Parts by Weight |
|---|---|
| EPON 829 | 508.4 |
| Bisphenol A | 48.5 |
| 5,5-dimethyl hydantoin | 62.5 |
| ethyl triphenyl phosphonium iodide | 1.2 |
| 2-ethylhexanol | 67.7 |
| FOAMKILL 639 | 9.0 |

The EPON 829 and Bisphenol A were charged to a reaction vessel and heated under a nitrogen blanket to 150° C. to initiate an exotherm. The reaction mixture was held at 152°–168° C. for about one hour followed by the addition of the hydantoin and the ethyl triphenyl phosphonium iodide.

The reaction mixture was kept at about 183°–192° C. for about one hour, cooled to 178° C. and the FOAMKILL 639 and 2-ethylhexanol added. The reaction mixture was further cooled to about 82° C. and quaternized with a mixture containing 186.2 parts of tri-N-butyl phosphine, 94.1 parts of an 88 percent by weight lactic acid solution and 56.0 parts by weight of deionized water. The reaction mixture was digested at 80°–90° C. for about 4 hours to form a quaternary phosphonium salt group-containing resin. The reaction mixture was cooled to room temperature and a 15 percent solids electrodeposition bath was prepared by combining 226 parts by weight of the reaction mixture prepared as described above with 21.1 parts of 2-ethylhexanol and 33.6 parts of butyl CELLOSOLVE and 985.1 parts by weight of deionized water.

A zinc phosphated pretreated steel panel was electrocoated in this electrodeposition bath at 100 volts for 60 seconds at a bath temperature of 78° F. (26° C.) to produce a water-resistant, somewhat greasy film. When the film was baked at 350° F. (177° C.) for 30 minutes, the cured film was dark and glossy.

EXAMPLE XV

The following example shows the preparation of a quaternary ammonium salt group-containing resin which is prepared by quaternizing a tertiary amine salt group-containing resin with propylene oxide.

A polyepoxide containing N-heterocyclic moieties in the polymer molecule is prepared from the following charge:

| Ingredient | Parts by Weight |
|---|---|
| EPON 829 | 3126.0 |
| Bisphenol A | 1008.0 |
| 5,5-dimethyl hydantoin | 214.0 |
| ethyl triphenyl phosphonium iodide[1] | 84.0 |
| 2-ethylhexanol | 547.0 |
| FOAMKILL 639 | 25.2 |

[1] 10 percent solids solution in phenyl CELLOSOLVE.

The EPON 829 and Bisphenol A were charged to a reaction vessel and heated under a nitrogen blanket to exotherm with the highest temperature being 208° C. Reaction was conducted for about one hour followed by cooling to 150° C. at which time the 5,5-dimethyl hydantoin and ethyl triphenyl phosphonium iodide catalyst solution added. The temperature of the reaction mixture was maintained between 165°–185° C. for about three hours. The reaction mixture was cooled, the 2-ethylhexanol and the FOAMKILL 639 added. The reaction mixture was then cooled to room temperature.

The polyepoxide prepared as described above was adducted with dimethylamine and the amine adduct quaternized with propylene oxide in the following charge ratio:

| Ingredient | Parts by Weight |
|---|---|
| polyepoxide prepared as described immediately above | 782.4 |
| butyl CELLOSOLVE | 80.2 |
| dimethylamine | 68.8 |
| butyl CELLOSOLVE | 219.0 |
| propylene oxide | 32.0 |
| lactic acid | 51.3 |
| deionized water | 49.0 |

The polyepoxide and butyl CELLOSOLVE were charged to a reaction vessel and heated to 90° C. The dimethylamine was added and the reaction mixture was digested at 80°–90° C. for about two hours. The second portion of butyl CELLOSOLVE was added and the reaction mixture was purged to remove the excess dimethylamine. The propylene oxide, lactic acid and deionized water were added and the reaction mixture digested at 70°–90° C. to form the quaternary ammonium salt group-containing resin. The reaction mixture had a solids content of 66.7 percent and contained 0.330 milliequivalents of total base per gram of resin. Analysis also indicated that the resin contained 0.294 milliequivalents of quaternary ammonium salt group per gram of resin indicating 89 percent by weight quaternary ammonium salt group formation.

Three hundred eighteen (318) parts by weight of the quaternary ammonium salt group-containing resin prepared as described above was combined with 1582 parts by weight of deionized water to form a 10 percent by weight solids electrodeposition bath. Zinc phosphated steel panels were electrodeposited in this bath at 300 volts for 60 seconds at a bath temperature of 78° F. (26° C.). The deposited film was smooth, continuous and water-resistant.

EXAMPLE XVI

The following example shows the preparation of a mixed quaternary ammonium-ternary sulfonium salt group-containing resin which also contains N-heterocyclic moieties in the resin molecule.

The resin was prepared from the following charge:

| Ingredient | Parts by Weight |
|---|---|
| EPON 829 | 1500.5 |
| Bisphenol A | 484.3 |
| 5,5-dimethyl hydantoin | 102.7 |

-continued

| Ingredient | Parts by Weight |
|---|---|
| ethyl triphenyl phosphonium iodide | 4.0 |
| 2-ethylhexyl half-capped 2,4-toluene diisocyanate (95 percent solids in methyl isobutyl ketone) | 185.6 |
| cyclohexanone | 156.2 |
| phenyl CELLOSOLVE | 281.8 |
| TEXANOL | 161.9 |
| thiodiethanol | 156.4 |
| 85 percent by weight aqueous lactic acid solution | 135.5 |
| dimethylethanolamine lactate (70 percent solids in isopropanol) | 76.4 |
| deionized water | 133.5 |
| ethyl CELLOSOLVE | 848.4 |

The EPON 829 and Bisphenol A were charged to a reaction vessel and heated under a nitrogen blanket to 155° C. to initiate an exotherm. The reaction was continued at exotherm for about one hour and the reaction cooled to 155° C. and the hydantoin and ethyl triphenyl phosphonium iodide added. The reaction mixture exothermed and the temperature was maintained between 159°-198° C. for about 2½ hours. The reaction mixture was cooled to 165° C. and one hundred parts by weight of the cyclohexanone added followed by the addition of the 2-ethylhexanol half-capped 2,4-toluene diisocyanate solution. The remaining portion of the cyclohexanone was then added followed by the sequential addition of the phenyl CELLOSOLVE and TEXANOL. At the completion of this addition, the thiodiethanol, lactic acid, deionized water and dimethylethanolamine lactate were added.

The reaction mixture was digested at about 87°-95° C. for about 1½ hours to form the mixed quaternary ammonium-ternary sulfonium salt group-containing resin. The reaction mixture was cooled to 90° C. and the ethyl CELLOSOLVE added. The final resin had an epoxy equivalent of about 61,000 and contained 58.6 percent total solids.

Three hundred thirty-three parts by weight of the mixed quaternary ammonium-ternary sulfonium salt group-containing resin was combined with four parts by weight of dibutyltin dilaurate curing catalyst and thinned with 1663 parts by weight of deionized water to form a 10 percent solids electrodeposition bath. Iron phosphated cold rolled steel panels were electrodeposited in this bath at 200 volts for 90 seconds at a bath temperature of 80° F. (27° C.). The resulting film was continuous and water-resistant. The film was then cured for 20 minutes at 350° F. (177° C.) to form a hard, somewhat cratered, solvent-resistant film.

We claim:

1. A water-dispersible resin which is electrodepositable on a cathode and which contains in the resin molecule cationic salt groups selected from the class consisting of amine salt groups, onium salt groups and mixtures thereof, said resin being prepared from polyglycidyl ethers of polyphenols which contain in the resin molecule N-heterocyclic moieties obtained by reacting said polyglycidyl ether of a polyphenol with an N-heterocyclic material containing a 5 or 6-membered ring and containing

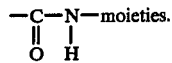

2. The resin of claim 1 which contains onium salt groups selected from the class consisting of quaternary ammonium, quaternary phosphonium and ternary sulfonium salt groups.

3. The resin of claim 2 which is formed from reacting:
(A) a polyglycidyl ether of a polyphenol having a 1,2-epoxy equivalency greater than 1,
(B) an N-heterocyclic material containing a 5 or 6-membered ring and containing

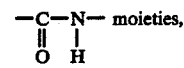

(C) a reactant selected from the group consisting of:
(1) an amine acid salt,
(2) a sulfide acid mixture,
(3) a phosphine acid mixture.

4. The resin of claim 1 in which the polyphenol is Bisphenol A.

5. The resin of claim 1 in which the N-heterocyclic material contains

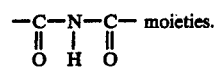

6. The resin of claim 1 in which the N-heterocyclic material has the following structural formula:

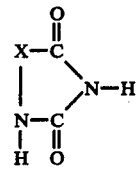

wherein X is a bivalent radical which is necessary to complete a 5-membered or 6-membered unsubstituted or substituted heterocyclic ring.

7. The resin of claim 6 in which the N-heterocyclic material is of the formula:

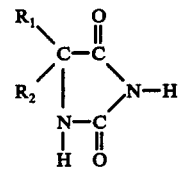

wherein $R_1$ and $R_2$ each represent a hydrogen atom, or an aliphatic, cycloaliphatic, araliphatic or aromatic hydrocarbon radical or wherein $R_1$ and $R_2$ together form a bivalent aliphatic or cycloaliphatic hydrocarbon radical.

8. The resin of claim 6 in which the N-heterocyclic material is of the formula:

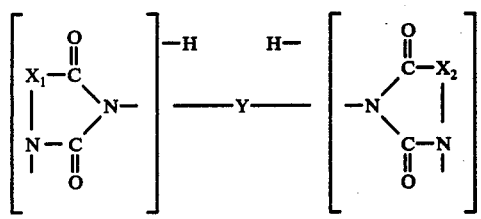

wherein, $X_1$ and $X_2$ independently of one another each denote a bivalent radical which is necessary to complete a 5 or 6-membered unsubstituted or substituted heterocyclic ring and Y represents a bivalent aliphatic, cycloaliphatic, aryl or aralipathic radical; Y also representing moieties containing ester linkages, amido linkages and hydroxy-containing polyether moieties.

9. The resin of claim 1 in combination with a fully blocked isocyanate.

10. The resin of claim 1 which contains blocked isocyanate moieties in the resin molecule.

11. The resin of claim 1 dispersed in aqueous medium.

UNITED STATES PATENT AND TRADEMARK OFFICE
CERTIFICATE OF CORRECTION

PATENT NO. : 4,110,287
DATED : August 29, 1978
INVENTOR(S) : Joseph F. Bosso and Nicholas T. Castellucci It is certified that error appears in the above-identified patent and that said Letters Patent are hereby corrected as shown below:

Column 1, line 33, "waterdispersible" should be --water-dispersible--.

Column 8, line 22, "sparameters" should be --parameters--.

Column 8, line 35, insert -- 4-methoxy- -- before "4-".

Column 10, line 43, "175" should be --157--.

Column 13, line 11, "bolts" should be --volts--.

Column 17, line 22, "acetoneresistant" should be --acetone-resistant--.

Signed and Sealed this

Thirteenth Day of March 1979

[SEAL]

Attest:

RUTH C. MASON
Attesting Officer

DONALD W. BANNER
Commissioner of Patents and Trademarks